US009445224B2

(12) United States Patent
Cavallaro et al.

(10) Patent No.: US 9,445,224 B2
(45) Date of Patent: Sep. 13, 2016

(54) SELECTIVE USER NOTIFICATION FOR LINK TERMINATION EVENTS IN WIRELESS PERSONAL AREA NETWORK

(71) Applicant: Google Technology Holdings LLC, Mountain View, CA (US)

(72) Inventors: Alberto R. Cavallaro, Northbrook, IL (US); Suzette M. Aguilar, Libertyville, IL (US); Martin R. Pais, North Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/053,098

(22) Filed: Feb. 25, 2016

(65) Prior Publication Data

US 2016/0174023 A1    Jun. 16, 2016

Related U.S. Application Data

(63) Continuation of application No. 14/227,164, filed on Mar. 27, 2014, now Pat. No. 9,307,429.

(51) Int. Cl.
*H04B 7/00* (2006.01)
*H04W 4/00* (2009.01)
*H04W 24/08* (2009.01)
(Continued)

(52) U.S. Cl.
CPC ............ *H04W 4/008* (2013.01); *G06F 21/88* (2013.01); *H04M 1/7253* (2013.01); *H04M 1/72516* (2013.01); *H04W 24/08* (2013.01); *H04W 64/003* (2013.01); *H04W 68/02* (2013.01); *H04W 76/06* (2013.01);
(Continued)

(58) Field of Classification Search
CPC .. H04W 84/18; H04W 84/20; H04M 1/7253
USPC ................................ 455/41.2–41.3, 421, 567
See application file for complete search history.

(56) References Cited

U.S. PATENT DOCUMENTS 6,774,796 B2    8/2004 Smith
7,664,463 B2    2/2010 Ben Ayed
(Continued)

FOREIGN PATENT DOCUMENTS

EP     2096845 B1    10/2010
WO    9834417 A1     8/1998

OTHER PUBLICATIONS

Motorola Mobility LLC, "Motorola Car Finder," https://play.google.com/store/apps/details?id=com.motorola.cp.carfinder&hl+en, Jul. 2, 2012, 2 pgs.

(Continued)

*Primary Examiner* — Lee Nguyen
(74) *Attorney, Agent, or Firm* — Shumaker & Sieffert, P.A.

(57) ABSTRACT

A user device includes a wireless interface to establish a wireless personal area network (WPAN) link with another user device. The user device further includes a notification controller to, in response to a link termination event (306) for the WPAN link, selectively trigger a user alert based on at least one of: an indication (312) of whether the user device is in proximity to a user; and an indication (314) of whether the other user device is identified as a user-portable device. The notification controller may selectively trigger a user alert further based on an indication (308) of whether the first device is connected to a specified wireless local area network (WLAN).

20 Claims, 6 Drawing Sheets

(51) Int. Cl.
*H04W 76/06* (2009.01)
*H04W 64/00* (2009.01)
*G06F 21/88* (2013.01)
*H04M 1/725* (2006.01)
*H04W 68/02* (2009.01)
*H04B 1/68* (2006.01)
*H04M 1/60* (2006.01)

(52) U.S. Cl.
CPC .... *G06F 2221/2111* (2013.01); *H04M 1/6066* (2013.01); *H04M 1/6075* (2013.01)

(56) References Cited

U.S. PATENT DOCUMENTS

| | | | |
|---|---|---|---|
| 8,467,770 | B1 | 6/2013 | Ben Ayed |
| 9,307,429 | B2 * | 4/2016 | Cavallaro ............. H04W 24/08 |
| 2012/0309388 | A1 | 12/2012 | Moosavi et al. |
| 2015/0281985 | A1 | 10/2015 | Cavallaro et al. |

OTHER PUBLICATIONS

Kelly Hodgkins, "Find My Car Smarter Uses Bluetooth Smart to Locate Your Car," http://www.tauw.com/2012/01/06/find-my-car-smarter-uses-bluethooth-smart-to-locate-your-car/, Jan. 6, 2012, 3 pgs.

Edward Kim, "Car Locater Bluetooth Plugin," http://www.androidzoom.com/android_applications/libraries_and_demo, printed Jun. 14, 2011, 2 pgs.

Bluetooth SIG Inc., "Bluetooth Specification: Proximity Profile," (PXP_SPEC), Jun. 21, 2011, 21 pgs.

International Search Report and Written Opinion of International Application No. PCT/US2015/022784, mailed Jul. 22, 2015, 11 pgs.

Prosecution History from U.S. Appl. No. 14/227,164 dated Jun. 19, 2015 through Dec. 3, 2015, 18 pgs.

* cited by examiner

SELECTIVE USER NOTIFICATION FOR LINK TERMINATION EVENTS IN WIRELESS PERSONAL AREA NETWORK

This application is a continuation of U.S. application Ser. No. 14/227,164 filed Mar. 27, 2014, which is incorporated herein by reference in its entirety.

FIELD OF THE DISCLOSURE

The present disclosure relates generally to device pairing and unpairing in wireless personal area networks.

BACKGROUND

Wireless personal area networks (WPANs), such as those based on a Bluetooth™ standard, enable a user to wirelessly connect multiple user devices relatively quickly and easily. One of the main advantages of a WPAN is that it allows efficient wireless tethering of devices in close proximity, such as wirelessly connecting a headset to a cellular phone, and thus enhancing the portability of WPAN-enabled user devices. However, this same portability can enable a user to accidentally leave behind or otherwise misplace one of the WPAN-connected devices.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The following description is intended to convey a thorough understanding of the present disclosure by providing a number of specific embodiments and details involving selective triggering of user alerts responsive to link degradations or terminations in a wireless personal area network. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the invention for its intended purposes and benefits in any number of alternative embodiments, depending upon specific design and other needs.

Wireless personal area network (WPAN) connection standards, such as the Bluetooth™, ZigBee™, and Wifi Direct™ WPAN standards, typically provide that paired devices automatically issue a user alert in response to termination of the WPAN link connecting the paired devices. These unpairing alerts can prove useful to notify a user that, for example, one of the user's devices is being left behind or forgotten. However, the relatively short range of WPAN connections often can lead to frequent unpairing alerts, which may become a significant distraction to the user. Moreover, in many instances the user may have already anticipated or expected the unpairing event, such as when a user exits a WPAN-enabled vehicle that was paired with the user's WPAN-enabled cellular phone or otherwise moves away from a non-user-portable WPAN-enabled device. In such instances, the user alert is unnecessary and thus can prove to be an annoyance to the user.

FIGS. 1-6 illustrate example techniques for selective user alert suppression in a WPAN system to mitigate the intrusiveness of user alerts in certain scenarios. In at least one embodiment, one or more devices in the WPAN system employ user alert filtering to suppress the triggering of certain user alerts for device unpairings in certain contexts. Recognizing that triggering a user alert when the user is not present to receive the user alert typically is unfruitful, the user device may suppress the user alert in response to an indication that the user device is not in proximity to the user. This indication of user proximity may be ascertained by the user device using sensor information from any of a variety of sensors available to the user device. Moreover, in certain instances a user may anticipate or expect an unpairing of the user device with the other user device because the user is in motion and other user device is a non-user-portable device, such as a device integrated into a vehicle, and thus may be stationary relative to the user's movement. As such, the user may expect the WPAN link between the two user devices to ultimately terminate as the user moves away from the non-user-portable device. As such, a user device may also suppress a user alert that otherwise would be issued in response to a link termination event in response to an indication that the other user device on the WPAN link is a non-user-portable device.

The issuance of link termination alerts also may be less welcome to a user when the user is in a location where the user is less concerned about the ramifications of leaving a device behind. To illustrate, when a user is at home or at the office, the user may be less concerned about leaving behind a particular user device as it is unlikely to be lost or stolen in such locations. Because these locations often are serviced by corresponding wireless local area networks (WLANs), the user device may use the WLAN servicing a specified location as a proxy for that location, and thus also proactively suppress link termination alerts when the user device is connected to the WLAN designated in this manner.

Thus, by proactively suppressing link termination alerts in the scenarios described herein, the issuance of unproductive or unnecessary link termination alerts may be reduced or eliminated. This in turn serves to reduce unnecessary distractions to the user, as well as render those link termination user alerts that do ultimately issue to be more useful to the user.

The term "link termination event," as used herein, may refer to actual WPAN link termination events, such as receipt of an explicit link termination message or a link timeout event, or anticipated WPAN link termination events, such as when the signal strength or other representation of the link quality of a WPAN link falls below a specified threshold or a negative rate of change in the link quality of a WPAN link exceeds a specified threshold. Moreover, in certain examples below, a link termination event may be referred to as an "unpairing" so as to use terminology consistent with the Bluetooth™ WPAN standards. However, while the Bluetooth™ WPAN standards are referenced frequently herein, the techniques described herein are not limited to these WPAN standards, but may also apply without limitation to other WPAN standards, such as the ZigBee™ and WiFi Direct™ WPAN standards. Further, while examples are described below in the context of a WiFi (IEEE 802.11x) WLAN standard, the techniques described herein are not limited to the WiFi Direct™ WLAN standards, but instead may be implemented using any of a variety of WLAN standards.

In some embodiments, the selective triggering of a user alert for a link termination event based on the criteria described herein can manifest as the triggering of a user alert responsive to all of the applicable criteria being met or suppressing triggering of any user alert responsive to one or more of the applicable criteria failing to be met. Alternatively, the selective triggering of a user alert can manifest as the triggering of the default type of user alert responsive to all of the applicable criteria being met or triggering an alternative type of user alert responsive to one or more of the applicable criteria failing to be met. To illustrate, the user device may be configured to default to issuing an audible user alert when a link termination event is detected, but if one of the criteria is deemed to have not been met, the user device may instead issue a less intrusive type of user alert, such as a vibrational alert or other tactile alert. Thus, unless otherwise noted, reference to selectively triggering a user alert may refer to selectively suppressing all user alerts or selectively triggering an alternative type of user alert.

Figure 1:
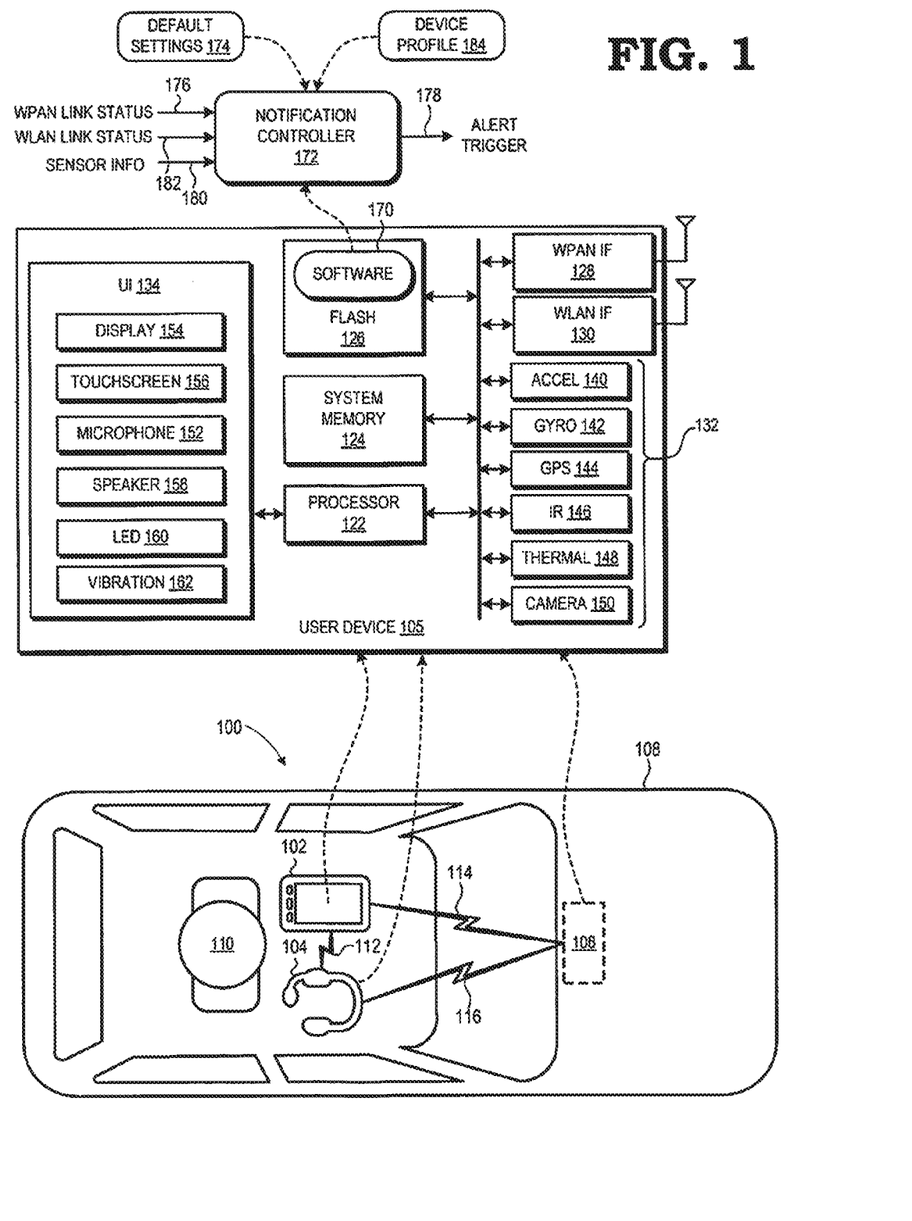
FIG. 1 is a diagram illustrating a wireless personal area network (WPAN) system employing user devices with selective user alert triggering for link termination events in accordance with at least one embodiment of the present disclosure.

FIG. 1 illustrates an example WPAN system 100 employing selective triggering of link termination user alerts in accordance with at least one embodiment of the present disclosure. The WPAN system 100 includes a plurality of WPAN-enabled user devices interconnected via point-to-point wireless links (referred to herein as "WPAN links"). The user devices can include either user-portable devices (that is, devices intended to be carried about by a user during use or in conjunction with their use) or non-user-portable devices (that is, devices not intended to be carried about by a user). Examples of user-portable devices include cellular phones, headsets, notebook computers, portable gaming consoles, personal digital assistants, computing-enabled watches (e.g., "smart watches") or other computing-enabled wearables (e.g., Google Glass™ devices). Examples of non-user-portable devices include WPAN-enabled devices integrated into vehicles, WPAN-enabled home entertainment systems, WPAN-enabled access points, desktop computers and servers, and the like.

In the depicted example, the WPAN system 100 includes user-portable devices in the form of a cellular phone 102 and a headset 104, and a WPAN-enabled audio receiver 106 integrated with a vehicle 108 of a user 110. The cellular phone 102 is linked to the headset 104 via a WPAN link 112 and to the audio receiver 106 via a WPAN link 114, and the headset 104 is linked to the audio receiver 106 via a WPAN link 116. For ease of illustration, the WPAN links 112, 114, and 116 are described herein in the example context of Bluetooth™ WPAN links.

FIG. 1 also depicts an example hardware implementation of a user device 105, which may generally represent the hardware implementation of each user device in the WPAN system 100, including one or more of the cellular phone 102, the headset 104, and the audio receiver 106. As illustrated, the user device 105 includes one or more processors 122 (e.g., a central processing device or CPU), one or more memories, such as system memory 124 and flash memory 126, a WPAN interface 128, a WLAN interface 130, a set 132 of sensors, and a user interface (UI) 134 connected via one or more busses 136 or other interconnects. The WPAN interface 128 includes a radio frequency (RF) transceiver compatible with one or more WPAN standards to establish one or more WPAN links with other user devices. Similarly, the WLAN interface 130 includes an RF transceiver compatible with one or more WLAN standards to establish one or more WLAN links with other user devices or with infrastructure devices, such as WiFi access points.

The set 132 of sensors includes one or more sensors utilized by the user device 105 to support its operation. Examples of such sensors can include an accelerometer 140, a gyroscope 142, a global positioning system (GPS) receiver 144, an infrared sensor 146, a thermal sensor 148, an imaging camera 150, a microphone 152 (illustrated as part of the UI 134), and the like. As described below, feedback from one or more of these sensors may be used to infer whether the cellular phone 102 is in proximity to the user 110.

The UI 134 receives input from the user 110, as well as provides information and other signaling to the user 110, and thus may include, for example, the microphone 152, a display component 154, a touchpanel 156 (integrated with, for example, the display component 154) or separate touchpad, a speaker 158, one or more light emitting diodes (LEDs) 160 or other light source disposed at the housing of the cellular phone 102, and one or more vibration components 162 or other haptic feedback devices. As described below, one or more components of the UI 134 may be used as a user notification component that is selectively activated by the user device 105 so as to issue user alerts for reception by the user 110 in response to link termination events for WPAN links established via the WPAN interface 128.

The processor 122 executes a set of instructions stored at one or more non-transitory computer readable media, such as the flash memory 126, the system memory 124, or a hard drive (not shown). The set of instructions represents a software application 170 (or multiple software applications 170), which manipulates the processor 122 to perform various software-based functionality to implement at least a portion of the techniques described herein, provide visual information via the display component 154, respond to user input via the user interface 134, and the like. In particular, the software application 170 implements a notification controller 172 that operates to manipulate the processor 122 and other hardware of the user device 105 to issue user alerts in response to various events occurring at the user device 105, including user alerts triggered by link degradation or termination events at the WPAN interface 128. In other embodiments, the notification controller 172 is implemented entirely in hardcoded logic and other hardware, such as a field programmable gate array (FPGA) or an application specific integrated circuit (ASIC), or as a combination of hardcoded logic and software executing on one or more processors 122.

As the user device 105 may connect to multiple other user devices, and as the status of various information related to the connections to the other user devices may frequently change, the notification controller 172 may utilize a device profile datastore 184 that stores device profile information pertaining to other these user devices. The device profile datastore 184 may be stored with the software application 170 or in a separate storage location of the user device 105. An example data structure for device profile information maintained in the device profile datastore 184 is described in detail below with reference to FIG. 2.

In operation, the notification controller 172 monitors WPAN link status information 176 from the WPAN interface 128 to identify when a WPAN link is established (such as the WPAN link 112 with the headset 104) and thereafter to identify whether a link degradation or termination event has occurred for the WPAN link. A link termination event may take a number of forms. In some instances, a link termination event may be an actual link termination event, such as a message or other signal transmitted from the other user device indicating that the WPAN link is being terminated by the other user device (e.g., the "close ( )" command specified by the Bluetooth™ standard) or a connection timeout event, such as a link supervision timeout as specified by the Bluetooth™ standard. In other instances, a link termination event may be an inferred link termination event, such as may be inferred from the WPAN link status information 176. For example, the notification controller 172 may infer that the WPAN link is effectively terminated or in the process of terminating when it detects a weak signal, that is, when a path loss, signal strength, or other indicator of link quality for the WPAN link falls below a specified threshold. As another example, the notification controller 172 may infer that the WPAN link is in the process of terminating when it detects that the WPAN link is rapidly weakening, as represented by a negative rate of change in the link quality of the WPAN link exceeding a specified threshold. An inferred link termination event may occur prior to an actual link termination event, so user alert suppression may be more helpful to a user when an inferred link termination event occurs.

In response to detecting a link termination event in a WPAN link, the notification controller 172 determines whether to issue an alert trigger 178 that activates one or more user notification components of the user device 105 to issue one or more user alerts for the link termination event. The user alert may be provided in the form of a visual alert, such as an icon displayed on the display component 154 or via illumination or flashing of the LED 160 at the housing of the cellular phone 102, an audible alert, such as a specified tone output by the speaker 158, or a tactile alert, such as a vibration of the user device 105 via the vibration component 162. In some embodiments, the user alert may be customized to reflect the other user device. For example, the other user device may be a headset with the model name "HX-550" and thus the user alert may be an audible alert in the form of speech synthesis announcing "Your connection to the HX-550 headset is dropping" or an icon displayed on the display component 154 in the shape of a headset having a red hue to represent the imminent disconnection of the headset. As another example, if the user device 105 is a headset and the other user device is a "Moto X" phone, the user alert may be a recording or a speech-synthesized audible alert announcing "Your connection to your Moto X phone is dropping".

As part of its configuration, the notification controller 172 may implement default settings 174 that set the notification controller 172 to issue a user alert in response to a link termination event, and the notification controller 172 may then selectively suppress the user alert based on one or more of the user proximity, other device type, and WLAN link criteria described herein. Alternatively, the default settings 174 may set the notification controller 172 to suppress a user alert in response to a link termination event, and the notification controller 172 may then selectively override this default prohibition on user alerts based on one or more of the user proximity, other device type, and WLAN link criteria. Further, in some embodiments, the user device 105 may be configured to issue a default type of user alert in response to a link termination event, but the notification controller 172 may determine whether to trigger the default type of user alert or replace the default user alert with a less-intrusive user alert based on an evaluation of the user proximity, the user-portability of the other device, or the WLAN connection status of the user device 105. To illustrate, the user device 105 may default to triggering an audible user alert via the speaker 158 in response to a link termination event, but in the notification controller 172 instead may use a less-intrusive vibrational alert via the vibration component 162 or a flashing light alert via the LED 160 in certain circumstances where a more discrete notification is likely to be warranted. For ease of illustration, example implementations of selectively overriding a default configuration to issue user alerts for all link termination events or a default configuration to issue a particular default type of user alert for a link termination event is described herein as the "selective suppression of user alerts" or the "selective triggering of user alerts."

In determining whether to suppress the default user alert, the notification controller 172 evaluates certain criteria that generally represent the likely efficacy of issuing a user alert in the current scenario. These criteria include an evaluation of whether the user device 105 is in proximity to the user 110, which is indicative of whether the user alert would be noticed by the user 110. The criteria also include an evaluation of whether the other user device on the other side of the WPAN link is a user-portable device or a non-user-portable device, which is indicative of whether the user 110 would be receptive to being notified of the unpairing with the other user device. As described in greater detail below, in the event that the notification controller 172 receives an indication that the user device 105 is not in proximity to the user 110, or receives an indication that the other user device on the WPAN link is not a user-portable type device, the notification controller 172 suppresses the default user alert by suppressing the triggering of any user alert or by substituting an alternative user alert type for the default user alert type. Otherwise, if there is an indication that the user device 105 is in proximity to the user 110 and an indication that the other user device is a user-portable type device, then the notification controller 172 may trigger the default user alert or otherwise avoid suppression of the default user alert after detecting the link termination or degradation event.

To determine whether the user device 105 is in proximity to the user 110, the notification controller 172 may use sensor information 180 from one or more sensors of the set 132. To illustrate, the accelerometer 140 may be used to determine whether the user device 105 is in motion, and if so, serve as an indication that the user device 105 is in motion. Likewise, motion, and thus user proximity, may be inferred from information from the gyroscope 142 or the GPS receiver 144. The infrared sensor 146 or the thermal sensor 148 may be used to detect body heat or proximity to the user's skin, which in turn indicates proximity to the user 110. As yet another example, the imaging camera 150 may capture one or more images, and these images may be subjected to image analysis by the user device 105 or a remote server to detect the presence of the user 110, a rapidly-changing external environment, or the presence of other people. Similarly, the microphone 152 may be used to pick up ambient sounds, which in turn may be analyzed to detect whether the user 110 is speaking, and thus indicating that the user 110 is in proximity to the user device 105.

To determine whether the other user device is a user-portable type or non-user-portable type, the notification controller 172 may utilize profile information signaled by the other user device or may infer the type of the other user device based on the type of data transmitted to or from the other user device. To illustrate, the Bluetooth™ standard specifies the use of Inquiry Access Codes (IACs) that are transmitted by a user devices as device profile information to signal the device's availability for pairing. Each IAC includes an 11-bit Class-of-Device/Service (CoD) field that is used to specify the class of device or class of service of the user device broadcasting the IAC. The device class or service class indicated by the IAC thus may be used to determine whether the other user device is a user-portable type or non-user-portable type, either expressly or through inference.

To illustrate, the notification controller 172 may identify the other user device as a user-portable device based on an IAC from the other user device indicating that the other user device is of the "Wearable" major device class, "Phone" major device class, or "Toy" major device class (irrespective of minor device class or service class) or based on an IAC from the other user device indicating that the other user device is of the "Computer" major device class and either the "handheld PC/PDA" or "palm sized PC/PDA" minor device classes. Conversely, the notification controller 172 may identify the other user device as a non-user-portable device based on an IAC that specifies the other user device is of the "LAN/Network Access Point" major device class (irrespective of minor device class or service class) or an IAC that specifies the other user device is of the "Computer" major device class and "Desktop Workstation" or "Server-Class Computer" minor device class, or an IAC that specifies the other user device is of the "Audio/Video" major device class and "Car Audio" or "Set-Top Box" minor device class. Moreover, the IAC is specified to include a number of reserved fields and reserved values, which may be repurposed so as to explicitly identify the transmitting device as either a user-portable type device or non-user-portable type device for the purposes of the selective triggering of user alerts as described herein.

In many situations, certain locations frequented by the user, such as the user's home, office, or vehicle, may be "safe areas" for misplaced user devices in that the user either expects certain user devices to be left behind, or the user will not be particularly troubled by the leaving behind of certain user devices. Accordingly, it may be advantageous to suppress user alerts when the user device is located in a "safe area." Such "safe areas" often are covered by one or more WLAN access points, and thus a WLAN link by a user device to one of these WLAN access point can be a relatively reliable indication that the user device is in or near one of these "safe areas." As such, the notification controller 172 may also use WLAN link information as another criterion in determining whether to issue or suppress a user alert in response to a link termination event.

To this end, the notification controller 172 can monitor WLAN link status information 182 from the WLAN interface 130 to determine whether the user device 105 has an active WLAN link associated with a designated WLAN access point associated with a safe area. The one or more WLANs associated with safe areas may be programmed by the user 110 through a graphical user interface (GUI) of the software application 170, or may be identified based on an analysis of previous WLAN connection history. If a designated WLAN link is present, the notification controller 172 may suppress or otherwise abstain from issuance of the default user alert or any user alert. Thus, in embodiments utilizing designated WLAN links as part of the selective user alert trigger criteria, the notification controller 172 suppresses the user alert or otherwise abstains from triggering the user alert in the event that the notification controller 172 receives an indication that the user device 105 is not in proximity to the user 110, receives an indication that the other user device on the WPAN link is not a user-portable type device, or receives an indication that the user device 105 has a WLAN link with a designated WLAN. Conversely, the notification controller 172 triggers a user alert or permits a user alert to be triggered when all of the following criteria are met: an indication that the user device 105 is in proximity to the user 110, an indication that the other user device is a user-portable type device, and an indication that the user device 105 is not connected to a designated WLAN.

Figure 2:
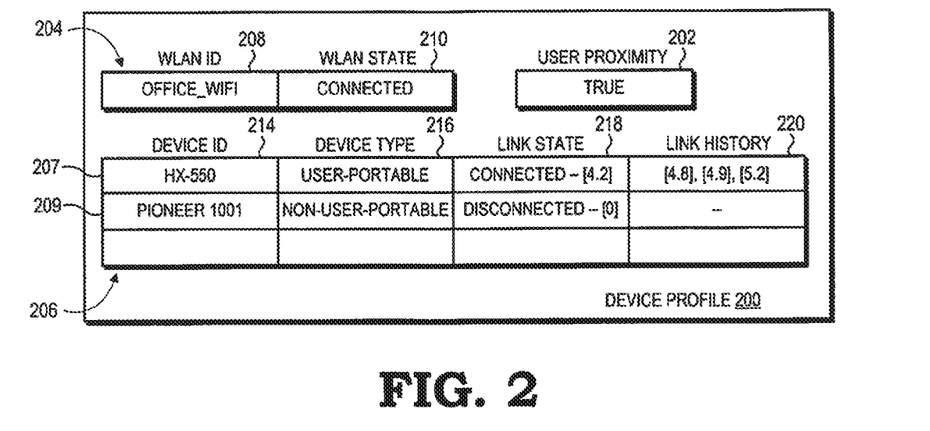
FIG. 2 is a diagram illustrating an example data structure for storing WPAN device profile information at a user device in accordance with at least one embodiment of the present disclosure.

FIG. 2 illustrates an example device profile data structure 200 maintained by the notification controller 172 in the device profile datastore 184 of FIG. 1 in accordance with at least one embodiment. In the depicted embodiment, the device profile data structure 200 includes a user proximity field 202, one or more WLAN fields 204, and a user device table 206. The user proximity field 202 stores a bit value, a Boolean value, or other indicator that represents whether the user device 105 is currently inferred to be proximate to a user. Alternatively, the user proximity field 202 can include one or subfields to store the current state and possibly historical states of one or more sensors, from which user proximity may be inferred. To illustrate, the user proximity field 202 can include a subfield indicating whether the accelerometer 140 (FIG. 1) indicates a current state of motion and a subfield indicating whether the IR sensor 146 has detected an IR signature consistent with proximity to a human body. The notification controller 172 then may determine whether a user is in proximity from the sensor states indicated by these subfields possibly compared against past states.

Each WLAN field 204 corresponds to a WLAN designated as corresponding to a specified "safe area" and includes a WLAN ID subfield 208 and a WLAN state field 210. The WLAN ID subfield 208 stores an ID associated with the WLAN, such as the basic service set identifier (BSSID) broadcast by access points associated with the WLAN. The WLAN state field 210 stores an indicator of the current state of the WLAN link between the user device 105 and the corresponding WLAN. As noted above, the user 110 may program the user device 105 to designate a certain WLAN as associated with a safe area, or the notification controller 172 may identify such WLANs through an analysis of previous WLAN connections established by the user device 105.

The user device table 206 includes one or more table entries, with each table entry provided for a corresponding user device to which the user device 105 is connected via a WPAN link, was previously connected via a WPAN link, or which has been identified as available for connection via a WPAN link. For example, the illustrated user device table 206 includes table entries 207 and 209 corresponding to the headset 104 and audio receiver 106 of FIG. 1, respectively. Each table entry includes a device ID subfield 214, a device type field 216, a link state field 218, and a link history field 220. The device ID subfield 214 stores an identifier of the corresponding user device, such as a media access control (MAC) address or a device model ID. The device type field 216 stores an indicator of whether the corresponding user device is a user-portable type device or a non-user-portable type device. Alternatively, the device type field 216 can include one or more subfields that store device profile information provided by the other user device during the WPAN pairing process, such as the major device class and minor device class information included in the IAC transmitted by the user device, as described above, and from this information the notification controller 172 can determine the user-portability of user device.

The link state field 218 stores an indicator of the current state of a WPAN link between the user device 105 and the corresponding user device. This indicator can include, for example, a Boolean value representing whether the WPAN link is connected or established or disconnected or not established, and if connected, an indicator of the current quality of the WPAN link, such as a quality value between 0.0 and 10.0. The link history field 220 stores information representing the history of the quality of the WPAN link, such as a set of one or more past link strength values measured or otherwise obtained by the notification controller 172. The link history field 220 thus may be used by the notification controller 172 to determine the rate of change in the quality of the corresponding WPAN link and identify a link termination event accordingly. To illustrate, assume that the link history field 220 of the table entry 207 includes three previous signal strength values determined at one second intervals for the last three seconds, with a signal strength of 5.2 at time t-3, 4.9 at time t-2, 4.8 at time t-1, and a current (time t=0) signal strength of 4.2. From this, the notification controller 172 may determine that the average rate of change in the WPAN link strength over the last three seconds is −0.33, and compare this with a specified rate-of-change threshold to determine whether a link termination event is deemed to have occurred.

During operation of the user device 105, the notification controller 172 updates the various fields of the device profile data structure 200 on a periodic or quasi-periodic basis, or in response to certain events that impact the information presented in the device profile data structure 200. To illustrate, the notification controller 172 may monitor the sensor information 180 provided by the set 132 of sensors, and in response to inferring that the user 110 is no longer in proximity, change the status of the user proximity field 202 accordingly. Similarly, in response to establishing a WPAN link with another user device, the notification controller 172 may populate a new table entry of the device table 206 with the corresponding information. On a periodic basis or in response to certain events, the notification controller 172 may update the table entry, such as by verifying whether the WPAN link is still connected and updating the link state field 218 or by obtaining the current signal strength of the WPAN link and adding it to the link history field 220.

Figure 3:
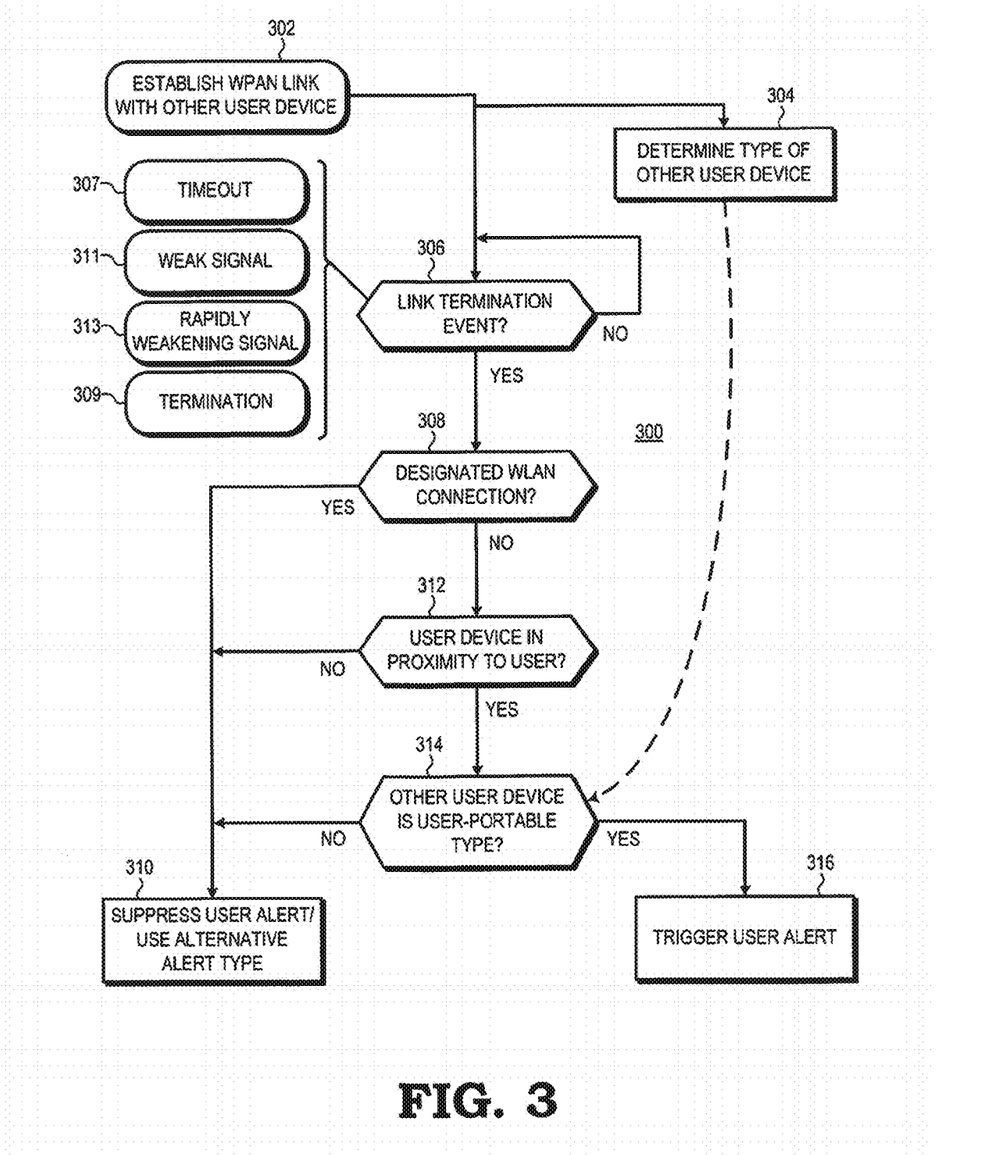
FIG. 3 is a flow diagram illustrating an example method for selective user alert triggering in response to link termination events in accordance with at least one embodiment of the present disclosure.

FIG. 3 illustrates an example method 300 for selective triggering of user alerts for link termination events in a WPAN-enabled user device in accordance with at least one embodiment. For ease of illustration, the method 300 is described in the example context of a user device 105 in the WPAN system 100 of FIG. 1. First, consider the user device 105 as being implemented in the cellular phone 102. The method 300 initiates at block 302 with the pairing or other connection of the user device 105 with another user device via the WPAN interface 128. In response to establishing the WPAN link, at block 304 the notification controller 172 determines the device type (user-portable or non-user-portable) of the other user device and populates an entry of the table 206 of the device profile data structure 200 (FIG. 2) with the device type information and other profile information pertaining to the other user device and current WPAN link status. As described above, in an implementation whereby the user devices are Bluetooth™-enabled devices, the user-portability of the other user device can be determined from, for example, the device classes and service classes represented in the IAC transmitted by the other device. In other embodiments, the type of the other user device may be determined from, for example, an ID transmitted by the other user device, or the type of data transmitted to, or received from, the other user device.

Concurrently, at block 306 the notification controller 172 monitors the WPAN link status information 176 from the WPAN interface 128 for an indication of a link termination event. A link termination event can take the form of an express link termination, such as a link timeout event 307 or a link termination message 309 from the other user device. A link termination event also can be inferred from various link quality indicia, such as a weak signal event 311 whereby the notification controller 172 determines that the link quality has fallen below a specified threshold, or a rapidly weakening signal event 313 whereby the notification controller 172 determines that the negative rate of change in the link quality has exceeded a specified threshold.

In response to detecting a link termination event at block 306, the notification controller 172 initiates the process of determining whether to suppress the default user alert for the link termination event. As described above, in some embodiments a connection to a designated WLAN serves as an indication that the user device 105 is in a "safe area" and thus rendering user alerts for link terminations unnecessary. Accordingly, at block 308 the notification controller 172 accesses the WLAN fields 204 of the device profile data structure 200 to determine whether the user device 105 currently is connected to a designated WLAN. If so, at block 310 the notification controller 172 suppresses the issuance of the default user alert for the link termination event, either by preventing the issuance of any user alert for the link termination event, or by selecting a less obtrusive type of user alert than the default alert type, such as using a tactile user alert in place of the default of an audible user alert.

Otherwise, if the user device 105 is not connected to a designated WLAN, or if the implementation of the user device 105 does not use a designated WLAN connection as a criterion for user alert suppression, at block 312 the notification controller 172 determines whether the user device 105 currently is in proximity to the user 110 based on the sensor information 180 from one or more sensors of the set 132 of sensors. In some instances, information from one sensor may be sufficient to make this determination. To illustrate, if the user device 105 represents a smart watch and the thermal sensor 148 indicates a temperature reading consistent with close proximity to human skin, the notification controller 172 may deem the user device 105 to be in proximity to the user 110. In other instances, the notification controller 172 may require corroborating evidence from multiple sensors. To illustrate, the user 110 may have left the user device 105 behind in a taxi cab and thus motion information from the accelerometer 140 or gyroscope 142, by itself, may not be sufficient to infer proximity to the user 110 as the detected motion could be from the motion of the taxi cab. Thus, the notification controller 172 may also consult other sensor information 180, such as by analyzing ambient sound detected by the microphone 152 in an attempt to verify the presence of the user's voice or by image analysis of imagery captured by the imaging camera 150 to verify the presence of the user 110 in the imagery.

If the notification controller 172 concludes that the user device 105 is not in proximity to the user 110, the method flow returns to block 310 and the notification controller 172 suppresses issuance of the default user alert for the link termination event, either by suppressing or otherwise abstaining from issuance of any user alert, or by bypassing the issuance of the default type of user alert and instead issuing an alternative type of user alert that is less intrusive.

Otherwise, if the notification controller 172 concludes that the user device 105 is in proximity to the user 110, at block 314 the notification controller 172 determines whether the other user device is a user-portable type device or a non-user-portable type device, such as by accessing the device type field 216 of the table entry for the other user device in the device profile data structure 200. In the event that the notification controller 172 identifies the other user device as a non-user-portable type device, the method flow returns to block 310, whereby the notification controller 172 either suppresses issuance of any user alert for the link termination event or replaces the default-type of user alert with a less-intrusive alternative type of user alert.

In the event that the user device 105 is not connected to a designated WLAN (or this criterion is no used in the particular implementation of the user device 105), the user device 105 is in proximity to the user 110, and the other user device is a user-portable type device, the issuance of the default user alert for the link termination event is deemed to be justified and likely to be appreciated by the user 110 and thus at block 316 the notification controller 172 triggers issuance of the default-type user alert for the link termination event. In addition to, or instead of, the cellular phone 102 implementing the user device 105 and the method 300 of FIG. 3, the headset 104 may implement the user device 105 and the method 300. Any number and type of user-portable devices, such as the computing devices and accessories mentioned earlier, may implement the user device 105 and the method 300.

Note that although FIG. 3 illustrates a particular review sequence for the designated WLAN criterion, user proximity criterion, and user device type criterion in blocks 308, 312, and 314, this sequence is only an example. In other embodiments, the notification controller 172 may evaluate these criteria in a different order, such as by analyzing user proximity first or device type first and designated WLAN connection last, or by determining one or more of these criteria concurrently, and selectively suppressing the default user alert accordingly.

Figure 4:
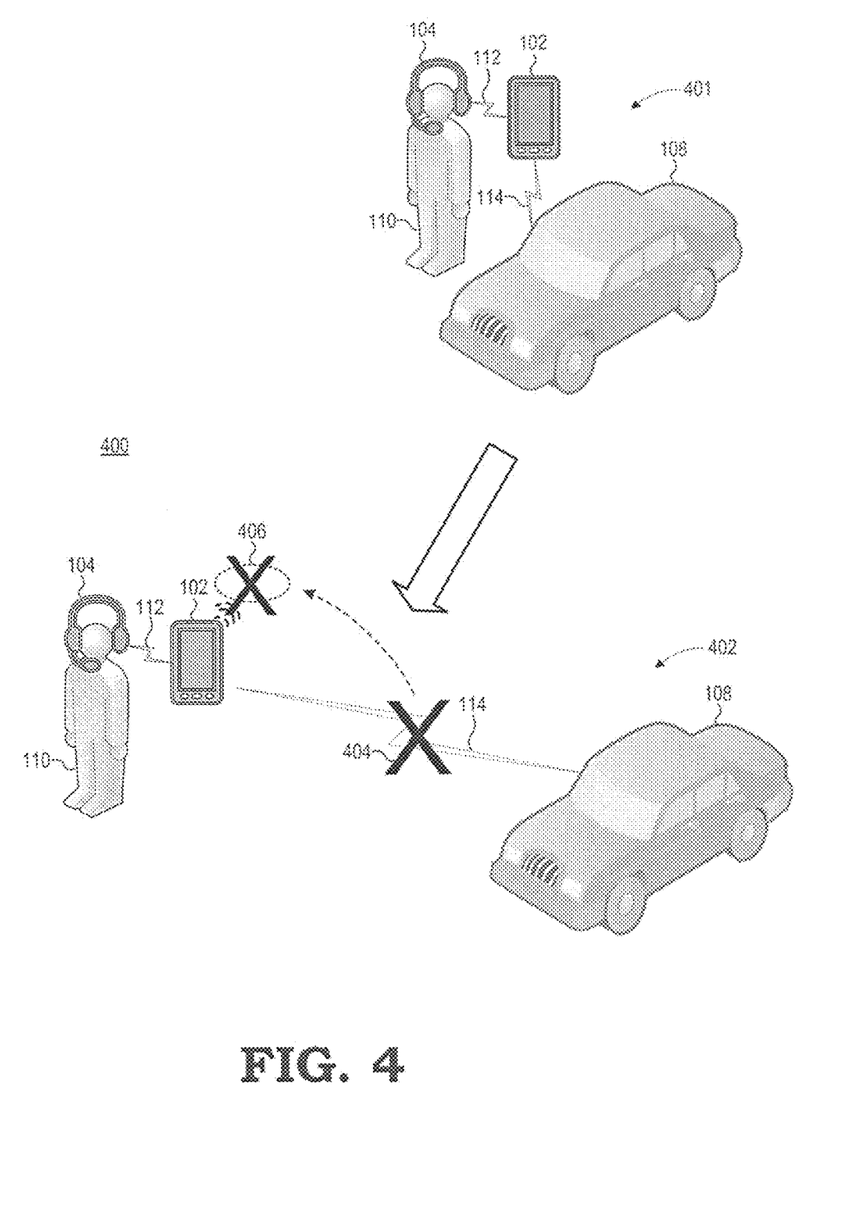
FIG. 4 is a diagram illustrating an example WPAN link termination scenario with a suppressed user alert in accordance with at least one embodiment of the present disclosure.
Figure 5:
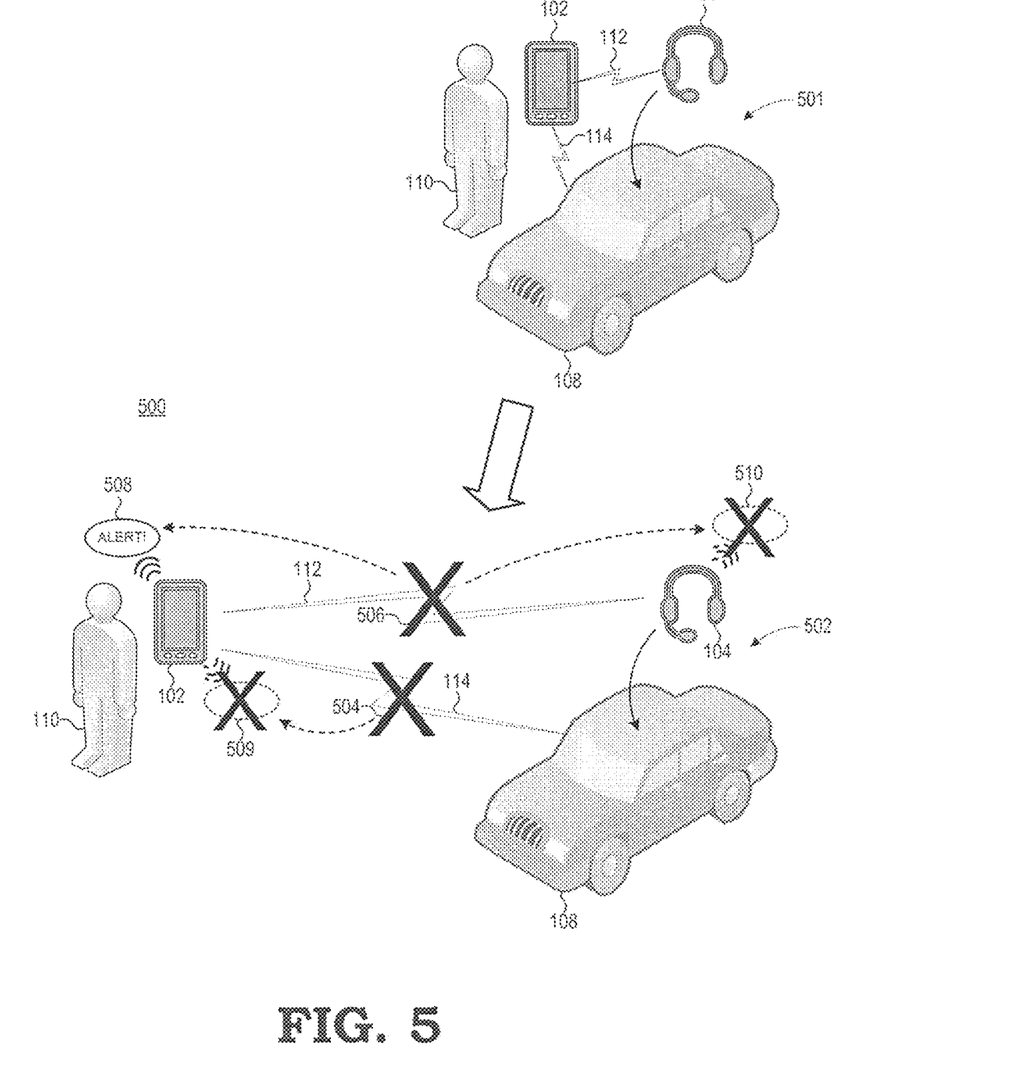
FIG. 5 is a diagram illustrating an example WPAN link termination scenario with both an unsuppressed user alert and a suppressed user alert in accordance with at least one embodiment of the present disclosure.
Figure 6:
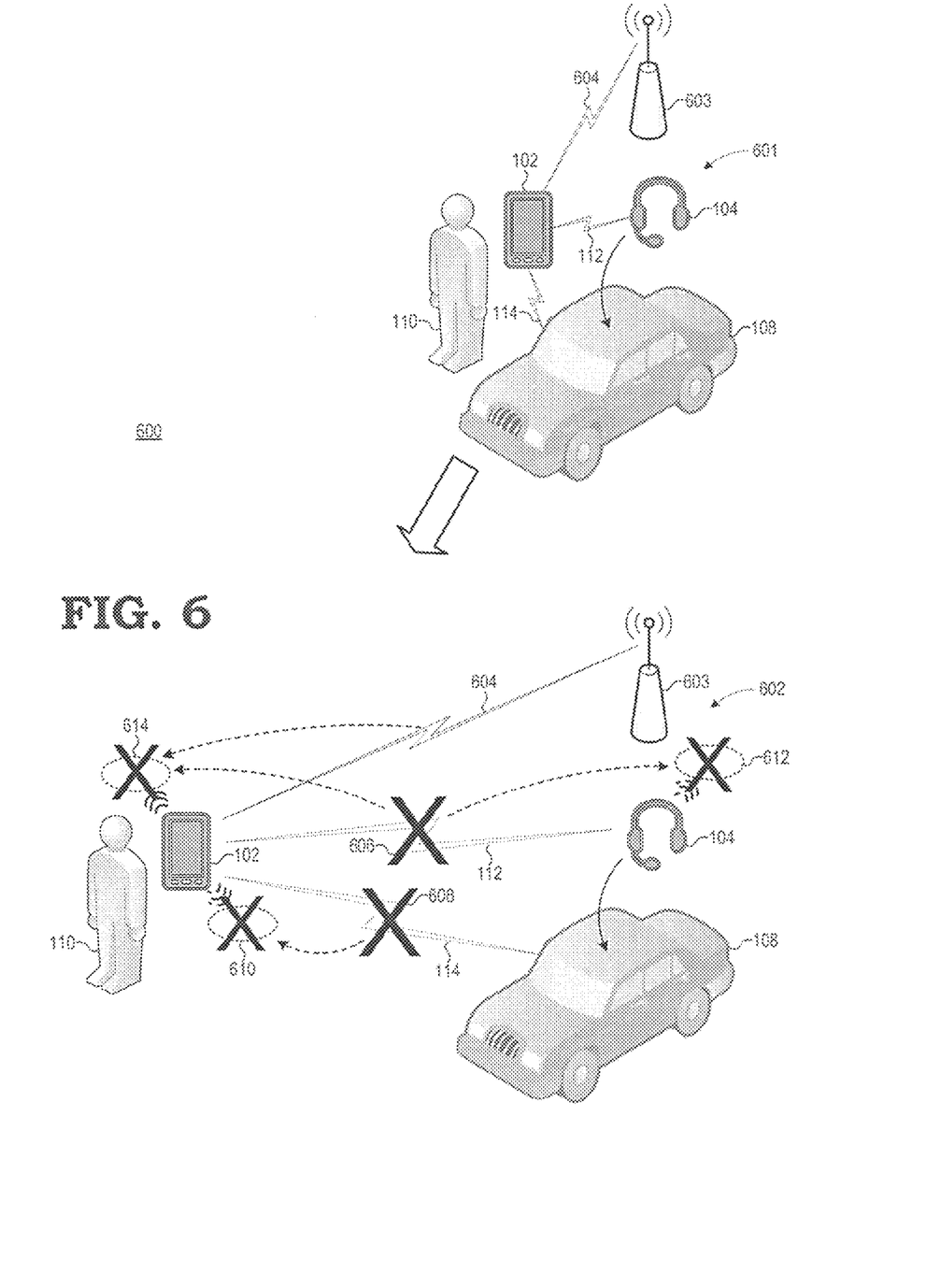
FIG. 6 is a diagram illustrating an example WPAN termination scenario with multiple suppressed user alerts in accordance with at least one embodiment of the present disclosure.

FIGS. 4-6 illustrate various unpairing scenarios for the user devices of the WPAN system 100 of FIG. 1 and the selective suppression of user alerts in response. FIG. 4 illustrates an example scenario 400 whereby at stage 401 the cellular phone 102 is connected to the headset 104 via the WPAN link 112 and connected to the audio receiver 106 (FIG. 1) of the vehicle 108 via the WPAN link 114. At stage 402, the user 110 leaves the vicinity of the vehicle 108 with the cellular phone 102 and headset 104. As the distance between the vehicle 108 and the user 110 increases, the WPAN link 114 eventually terminates. The cellular phone 102 is configured to issue a default user alert 406 in response to a link termination event. However, in this instance the audio receiver 106 issued an IAC specifying an "Audio/Video" major device class and a "Car Audio" minor device class and thus the notification controller 172 of the cellular phone 102 determines that the audio receiver 106 is a non-user-portable type device. As such, the notification controller 172 suppresses issuance of the default user alert 406 either by preventing any user alert from being issued, or by using a less-intrusive user alert in place of a default user alert.

FIG. 5 illustrates an example scenario 500 whereby at stage 501 the cellular phone 102 is connected to the headset 104 via the WPAN link 112 and connected to the audio receiver 106 (FIG. 1) of the vehicle 108 via the WPAN link 114. At stage 502, the user 110 leaves the vicinity of the vehicle 108 with the cellular phone 102 but the user 110 accidentally leaves the headset 104 behind in the vehicle 108. As the distance between the vehicle 108 and the user 110 increases, the WPAN link 112 and the WPAN link 114 eventually terminate. As with the scenario 400 of FIG. 4, the notification controller 172 of the cellular phone 102 suppresses issuance of a default user alert 509 for the link termination event 504 representing termination of the WPAN link 114 because the audio receiver 106 is a non-user-portable type device.

With respect to a link termination event 506 representing termination of the WPAN link 112, the notification controller 172 of the cellular phone 102 verifies that the cellular phone 102 is in proximity to the user 110 and verifies that the headset 104 is a user-portable type device, as indicated by the "Audio/Video" major device class and "Wearable Headset Device" minor device class indicated in the IAC broadcast by the headset 104. Because both of the user proximity and user-portable device criteria are met, the notification controller 172 of the cellular phone 102 permits issuance of a default user alert 508 for the termination of the WPAN link 112. In contrast, the headset 104 is no longer in proximity to the user 110 and the notification controller 172 of the headset 104 identifies the headset 104 as such. In response to the user proximity criterion not being met for the headset 104, the notification controller 172 of the headset 104 suppresses issuance of a default user alert 510 by the headset 104 either by preventing any user alert from being issued at the headset 104, or by using a less-intrusive user alert at the headset 104 in place of a default user alert.

As a modification to the example scenario 500 of FIG. 5, the user 110 may leave the vehicle 108 with the headset 104 and accidentally leave the cellular phone 102 in the vehicle 108. In this situation, the WPAN link 112 between the headset 104 and the cellular phone 102 eventually would terminate. In response to this link termination event, the notification controller 172 of the headset 104 would determine that the headset 104 is in proximity to the user 110 and that the cellular phone 102 is a user-portable device, and thus the notification controller 172 of the headset 104 would permit issuance of the default user alert 510 set for the headset 104. However, the notification controller 172 of the cellular phone 102 in this scenario would determine that it is not in proximity to the user 110, and thus the notification controller 172 of the cellular phone 102 would suppress issuance of the default user alert 508 set for the cellular phone 102.

FIG. 6 illustrates an example scenario 600 in which the user has specified a WLAN as a "safe area" for purposes of user alert suppression. This WLAN may be, for example, a WLAN in the user's house, a WLAN provided at the user's place of employment, a WLAN provided by the vehicle 108, and the like. At stage 601 of this scenario, the cellular phone 102 is connected to the headset 104 via the WPAN link 112 and connected to the audio receiver 106 (FIG. 1) of the vehicle 108 via the WPAN link 114. At stage 601, the cellular phone 102 also is connected to an access point 603 associated with the designated WLAN via a WLAN link 604.

At stage 602, the user 110 has left the vicinity of the vehicle 108 with the cellular phone 102 while leaving the headset 104 behind in the vehicle 108. At this stage, the link qualities of the WPAN links 112 and 114 have fallen sufficiently to trigger respective link termination events 606 and 608 but cellular phone 102 is still connected to the designated WLAN via the WLAN link 604. In response to the link termination event 608, the notification controller 172 of the cellular phone 102 suppresses issuance of the default user alert 610 that otherwise would be issued by the cellular phone 102 for the link termination event 608 because the audio receiver 106 is a non-user-portable type device and thus fails to meet the user-portable device criterion for permitting issuance of the default user alert.

In response to the link termination event 606, the notification controller 172 of the headset 104 identifies that the headset 104 is no longer in proximity to the user 110 from, for example, a lack of feedback via the microphone 152 of the headset 104 and thus suppresses issuance of the default user alert 612 that otherwise would have been issued. Further, while the notification controller 172 of the cellular phone 102 identifies the user proximity and user-portable device type criteria as being met in this scenario, the cellular phone 102 is still connected to the WLAN via the WLAN link 604. Accordingly, the notification controller 172 suppresses issuance of the default user alert 614 that otherwise would be issued by the cellular phone 102 for the link termination event 606.

As the example scenarios of FIGS. 4-6 illustrate, a WPAN-enabled user device can use some or all of the user proximity, user-portable device, and WLAN connection criteria described above to selectively suppress the user alerts otherwise issued by default in response to WPAN link termination events in a manner that reduces the incidence of user alerts issued in a manner that is ineffective because the user is not present or issued in a manner that distracts or otherwise annoys the user because the user either already anticipated or expected the WPAN link termination or the user is less concerned about the possibility of misplacing a user device under the circumstances.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

It will be appreciated that the methods and the user interface device described herein may include one or more conventional processors and unique stored program instructions that control the one or more processors, to implement, in conjunction with certain non-processor circuits, some of the functions of the user interface device described herein. The non-processor circuits may include, but are not limited to, wireless transmitter and receiver circuits, signal drivers, clock circuits, power source circuits, sensor circuits, and the like.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/ dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method comprising:
    establishing, by a first device, a wireless personal area network link between the first device and a second device, and a wireless personal area network link between the first device and a third device, wherein the first device is configured to default to issue an alert in response to detecting a link termination event for any wireless personal area network link between the first device and any other device;

detecting, by the first device, a link termination event for the wireless personal area network link between the first device and the second device;

responsive to determining that the second device is not a user-portable device, suppressing, by the first device, issuance of the alert;

detecting, by the first device, a link termination event for the wireless personal area network link between the first device and the third device; and responsive to determining that the third device is a user-portable device, issuing, by the first device, the alert.

2. The method of claim 1, further comprising:

determining, by the first device, a rate of change of a link quality of the wireless personal area network link between the first device and the second device, wherein detecting the link termination event for the wireless personal area network link between the first device and the second device is based on the rate of change of the link quality.

3. The method of claim 2, wherein detecting the link termination event for the wireless personal area network link is in response to determining that the rate of change of the link quality is a negative rate of change that exceeds a threshold negative rate of change.

4. The method of claim 1, wherein suppressing issuance of the alert is further in response to determining, by the first device, that the first device is not in proximity to a user.

5. The method of claim 4, wherein determining that the first device is not in proximity to the user is based at least in part on sensor information from a set of one or more sensors, the set of one or more sensors including at least one of: an accelerometer; a gyroscope; an infrared sensor; a thermal sensor; a global positioning system (GPS) receiver; a microphone; and an imaging camera.

6. The method of claim 1, wherein establishing the wireless personal area network link between the first device and the second device includes receiving, by the first device and from the second device, profile information for the second device, the method further comprising:

determining, by the first device, based on the profile information, whether the second device is a user-portable device.

7. The method of claim 6, wherein:

the profile information indicates at least one of a device class of the second device or a service class of the second device, and determining whether the second device is a user-portable device is based on at least one of the device class or the service class.

8. The method of claim 1, wherein the link termination event for the wireless personal area network link between the first device and the second device comprises one or more: a termination of the wireless personal area network link between the first device and the second device; a timeout of the wireless personal area network link between the first device and the second device; a link quality of the wireless personal area network link between the first device and the second device below a threshold; or a negative rate of change of a link quality of the wireless personal area network link between the first device and the second device exceeding a threshold.

9. A first device comprising:

a wireless interface that establishes a wireless personal area network link between the first device and a second device, and a wireless personal area network link between the first device and a third device;

a non-transitory computer readable media that stores a notification controller configured to default to issuing an alert in response to detecting a link termination event for any wireless personal area network link between the first device and any other device; and a processor that executes the notification controller to detect a link termination event for the wireless personal area network link between the first device and the second device, responsive to determining that the second device is not a user-portable device, suppress issuance of the alert, detect a link termination event for the wireless personal area network link between the first device and the third device, and, responsive to determining that the third device is a user-portable device, issue the alert.

10. The first device of claim 9, wherein the processor further executes the notification controller to:

determine a rate of change of a link quality of the wireless personal area network link between the first device and the second device; and detect the link termination event for the wireless personal area network link between the first device and the second device is based on the rate of change of the link quality.

11. The first device of claim 10, wherein the notification controller detects the link termination event for the wireless personal area network link is in response to determining that the rate of change of the link quality is a negative rate of change that exceeds a threshold negative rate of change.

12. The first device of claim 9, wherein the processor further executes the notification controller to suppress issuance of the alert is further in response to determining, by the first device, that the first device is not in proximity to a user.

13. The first device of claim 9, wherein:

the wireless interface receives, from the second device, profile information for the second device, and the processor further executes the notification controller to determine, based on the profile information, whether the second device is a user-portable device.

14. The first device of claim 13, wherein:

the profile information indicates at least one of a device class of the second device or a service class of the second device, and the processor further executes the notification controller to determine whether the second device is a user-portable device based on at least one of the device class or the service class.

15. The first device of claim 9, wherein the link termination event for the wireless personal area network link between the first device and the second device comprises one or more: a termination of the wireless personal area network link between the first device and the second device; a timeout of the wireless personal area network link between the first device and the second device; a link quality of the wireless personal area network link between the first device and the second device below a threshold; or a negative rate of change of a link quality of the wireless personal area network link between the first device and the second device exceeding a threshold.

16. A non-transitory computer readable media encoded with instructions that, when executed, cause a processor of a first device to:

establish a wireless personal area network link between the first device and a second device, and a wireless personal area network link between the first device and a third device, wherein the first device is configured to default to issue an alert in response to detecting a link termination event for any wireless personal area network link between the first device and any other device;

detect a link termination event for the wireless personal area network link between the first device and the second device;

responsive to determining that the second device is not a user-portable device, suppress issuance of the alert;

detect a link termination event for the wireless personal area network link between the first device and the third device; and responsive to determining that the third device is a user-portable device, issue the alert.

17. The non-transitory computer readable media of claim 16, wherein the instructions further cause the processor to:
determine a rate of change of a link quality of the wireless personal area network link between the first device and the second device; and
detect the link termination event for the wireless personal area network link between the first device and the second device is based on the rate of change of the link quality.

18. The non-transitory computer readable media of claim 17, wherein the processor detects the link termination event for the wireless personal area network link is in response to determining that the rate of change of the link quality is a negative rate of change that exceeds a threshold negative rate of change.

19. The non-transitory computer readable media of claim 16, wherein the instructions further cause the processor to suppress issuance of the alert is further in response to determining, by the first device, that the first device is not in proximity to a user.

20. The non-transitory computer readable media of claim 16, wherein the instructions further cause the processor to:
receive, from the second device, profile information for the second device; and
determine, based on the profile information, whether the second device is a user-portable device.

* * * * *